United States Patent
Esmail et al.

(10) Patent No.: US 10,586,632 B2
(45) Date of Patent: Mar. 10, 2020

(54) STRUCTURAL CABLE

(71) Applicant: Tesla, Inc., Palo Alto, CA (US)

(72) Inventors: Adnan Esmail, Palo Alto, CA (US); In Jae Chung, San Jose, CA (US); Lukas Josef Pankau, Palo Alto, CA (US); Balraj Singh, Morgan Hill, CA (US); Maxwell Pfeiffer, Seattle, WA (US); Satyan Chandra, Mountain View, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/949,250

(22) Filed: Apr. 10, 2018

(65) Prior Publication Data

US 2018/0294075 A1 Oct. 11, 2018

Related U.S. Application Data

(60) Provisional application No. 62/484,198, filed on Apr. 11, 2017.

(51) Int. Cl.

| | |
|---|---|
| *H01B 9/00* | (2006.01) |
| *H01B 7/02* | (2006.01) |
| *H01B 13/14* | (2006.01) |
| *H01R 24/28* | (2011.01) |
| *B29C 47/02* | (2006.01) |
| *B29C 47/00* | (2006.01) |
| *B29C 48/05* | (2019.01) |
| *B29C 48/154* | (2019.01) |

(Continued)

(52) U.S. Cl.
CPC .............. *H01B 9/003* (2013.01); *B29C 48/05* (2019.02); *B29C 48/154* (2019.02); *H01B 7/0275* (2013.01); *H01B 7/0823* (2013.01); *H01B 13/14* (2013.01); *H01R 24/28* (2013.01); *B29K 2705/00* (2013.01); *B29K 2995/0005* (2013.01); *B29L 2031/3462* (2013.01); *H01B 7/0869* (2013.01); *H01B 7/40* (2013.01); *H01R 13/2407* (2013.01); *H01R 2107/00* (2013.01); *H01R 2201/26* (2013.01)

(58) Field of Classification Search
CPC .... H01B 9/003; H01B 7/0275; H01B 7/0823; H01B 13/14; B29C 48/154; B29C 48/05; H01R 24/28
USPC ....................................... 174/117 R
See application file for complete search history.

(56) References Cited

U.S. PATENT DOCUMENTS

| | | | |
|---|---|---|---|
| 10,096,952 B1 * | 10/2018 | Silver | ............... H01B 9/003 |
| 2002/0046870 A1 * | 4/2002 | Zein | ............... H01B 7/0869 |
| | | | 174/117 F |

(Continued)

FOREIGN PATENT DOCUMENTS

EP          0305058 A2      3/1989

OTHER PUBLICATIONS

International Searching Authority; International Search Report and Written Opinion; International Application No. PCT/IB2018/052546; dated Jul. 6, 2018; 13 pgs.

*Primary Examiner* — Timothy J Thompson
*Assistant Examiner* — Charles Pizzuto
(74) *Attorney, Agent, or Firm* — Knobbe Martens Olson & Bear LLP

(57) ABSTRACT

A structural cable comprising a first conductor, a structural element, and a body with proximal and distal ends that is formed around the first conductor and the structural element, wherein the body is made of a non-conducting material.

12 Claims, 16 Drawing Sheets

(51) Int. Cl.
*H01B 7/08* (2006.01)
*H01R 107/00* (2006.01)
*B29K 705/00* (2006.01)
*B29L 31/34* (2006.01)
*H01R 13/24* (2006.01)
*H01B 7/40* (2006.01)

(56) References Cited

U.S. PATENT DOCUMENTS

| | | | |
|---|---|---|---|
| 2008/0250632 A1* | 10/2008 | Dayton | H01B 7/40 |
| | | | 29/825 |
| 2011/0232938 A1* | 9/2011 | Kodama | H01B 7/0838 |
| | | | 174/117 F |
| 2014/0187080 A1* | 7/2014 | Holland | H01B 7/0869 |
| | | | 439/502 |
| 2017/0069991 A1* | 3/2017 | Hombo | H01R 12/79 |
| 2017/0207549 A1* | 7/2017 | Chang | H01R 4/04 |

* cited by examiner

STRUCTURAL CABLE

CROSS-REFERENCE TO RELATED APPLICATION

The present U.S. Utility Patent Application claims priority pursuant to 35 U.S.C. § 119(e) to U.S. Provisional Application No. 62/484,198, entitled "STRUCTURAL CABLE", filed Apr. 11, 2017, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

The present disclosure relates to a structural cable. More particularly, the present disclosure relates to a structural cable, capable of maintaining form, that typically contains multiple collinear wires or conductors formed together with a structural element that provides rigidity to the assembly in at least one direction in a least a portion of the wire.

Description of Related Art

Traditional cables, such as component cables, USB cables, or HDMI cables are easy to manipulate with human hands for connecting with appropriate connectors that are disposed on different structures or devices. However, the installation of these cables is difficult to automate. The cables lack sufficient structural integrity and rigidity to be easily picked up, moved, and placed by a robotic arm. Further, because traditional cables are not rigid, they may not be easily formed into different shapes and routed to a pre-determined location amidst tight spatial constraints. Routing traditional, flexible cables during manufacturing, for example to connect different components during automobile manufacturing, typically cannot be automated and therefore require humans to place by hand. Such manual placement is time consuming, tedious, and costly. In addition, while certain traditional cables, like USB Type-C cables are designed to serve multiple purposes (such as power transmission, data, and video over a single cable), specific applications may not require the transfer of all three types of information.

Hence, there is a need for a structural cable that overcomes the aforementioned drawbacks.

Figure 1A:
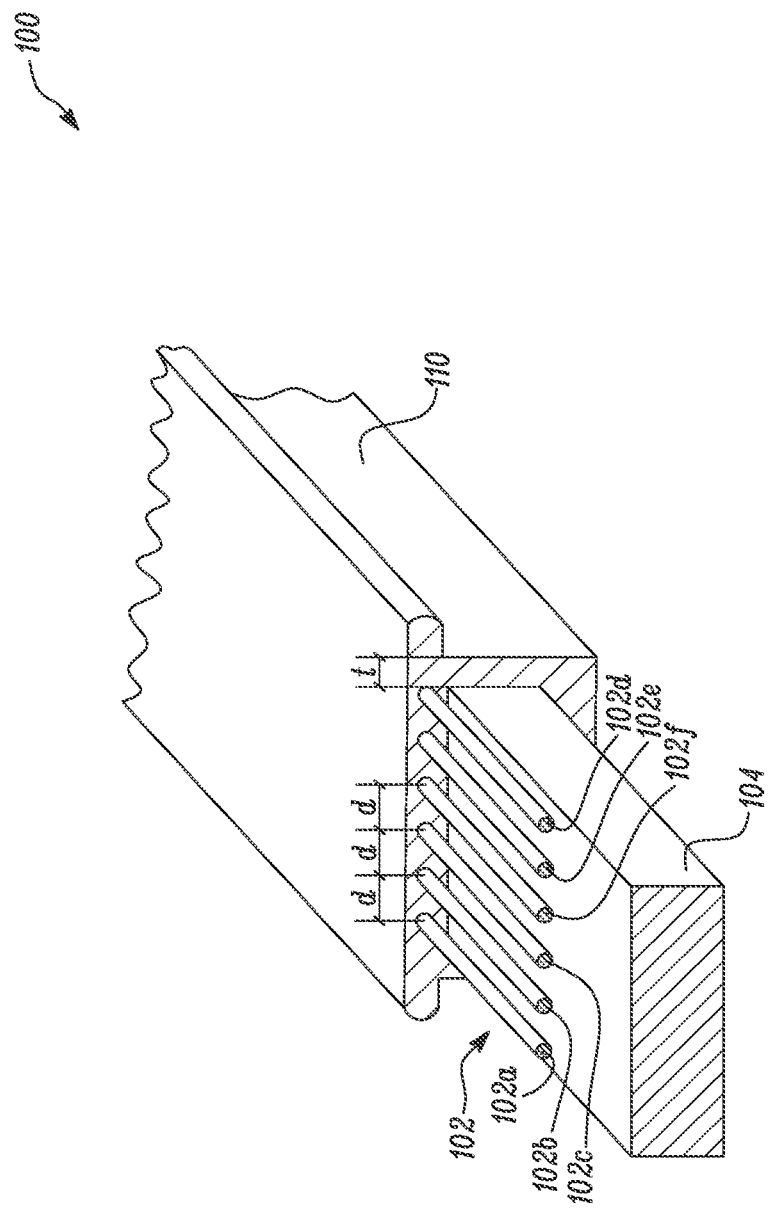
FIG. 1A illustrates a perspective-sectional view of a structural cable showing a body with multiple wires arranged in a flat configuration and located alongside a structural element embedded in the body according to certain embodiments of the current invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure relates to a structural cable. More particularly, the present disclosure relates to a structural cable that contains one or more wires formed with a structural element that provides rigidity to the structural cable in at least one direction. Typically, multiple wires or conductors (or multiple wire bundles or conductors, such as twisted wire/conductor pairs) will be formed in a collinear orientation or otherwise have the ends fanned out into a collinear orientation (that is the wires or conductors may exist in different orientations throughout the bulk, but the ends will be collinear).

The structural cable according to the present disclosure is a cable with structural integrity that may be manipulated into place by a robotic arm as part of an automated process while providing reliable data connections to its desired location. As part of the form manipulation, the structural cable preferentially allows manipulation into different geometries allowing for placement that avoids obstacles, and that can be performed in a reproducible manner so as to be implemented as part of an automated process.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1A illustrates a perspective sectional view of a structural cable 100. As shown, the structural cable 100 has six collinear wires or conductors 102a-f. However, in other embodiments, there may be fewer or greater than six wires/conductors and the wires/conductors need not be collinear. Nonetheless, it is desirable to have the wire/conductor geometry set for ease of attachment of the end connectors (as discussed later). Further, the structural cable may contain multiple wires/conductors disposed together (such as twisted wire/conductor pairs) instead of a single wire/conductor at the indicated locations. In other embodiments, multiple wires/conductor (for example a pair of wires/conductors) may be coaxial wrapped. In other embodiments, multiple wires or conductors may be twisted together through the length of the structural cable with the ends fanned out into a collinear orientation (that is the wires or conductors may exist in different orientations throughout the bulk, but the ends will be collinear).

According to embodiments of the current disclosure, the wires 102a-f of the structural cable 100 may include wires/conductors that are configured for use in power transmission and/or wires/conductors that are configured for use in data transmission. In specific embodiments, one or more of the wires/conductors 102 has an impedance between 40 and 50 Ohms, such as 45 Ohms.

Moreover, as shown in FIG. 1A, these wires/conductors 102 are arranged in a flat (and collinear) configuration. Although such a collinear configuration is not necessary, it is desirable to arrange the wires/conductors in a set geometry so as to aid automation of, for example, the addition of connectors to the structural cable. FIG. 1A shows an example of this set geometry with each of the six wires/conductors collinear and spaced by a distance 'd' between each pair of adjacently located wires/conductors 102. For example, the distance 'd' for wires/conductors 102a-102b and wires/conductors 102b-102c is equal. However, the wire-to-wire distances may be different.

An advantage of this flat cable configuration with known geometries and wires/conductors spaced at known dimensions (and preferably collinear) is that the process of connecting the flat wires/conductors to connectors may be automated through, for example crimping, traditional soldering, encased, or laser soldering. In a specific implementation, encased wires are held on a flat conveyer or with a robotic arm, and the wires are stripped using a stripping attachment so as to preserve the wire spacing. The robotic arm (or another robotic arm) may then pick up a connector and crimp the connector to the wires by pressing down (or utilizing an appropriate tool). Specific connectors and the connecting process is described in further detail below. Alternatively, the known, constant spacing of the wires may be used to reliably solder the wires to the connector, with the wires being connected to pins in the connector. Further, the spacing 'd' between the wires and/or between the pins (i.e., the pin pitch) may be varied, cable to cable and also within the same structural cable. For example, the spacing between the wires and/or pins within the connector may be varied to optimize signal integrity on high-frequency carriers and minimize space on power and low-frequency pins. It may also be used to control the impendence so as to remove or reduce the circuitry outside of the structured cable (for example, on a printed circuit board connected to a receptacle). In certain embodiments, instead of pins, thongs (i.e., metal fingers), pads, the wires/conductors themselves, a socket, or another connection method may be used to connected the structural cable to a connector or another component.

Figure 2:
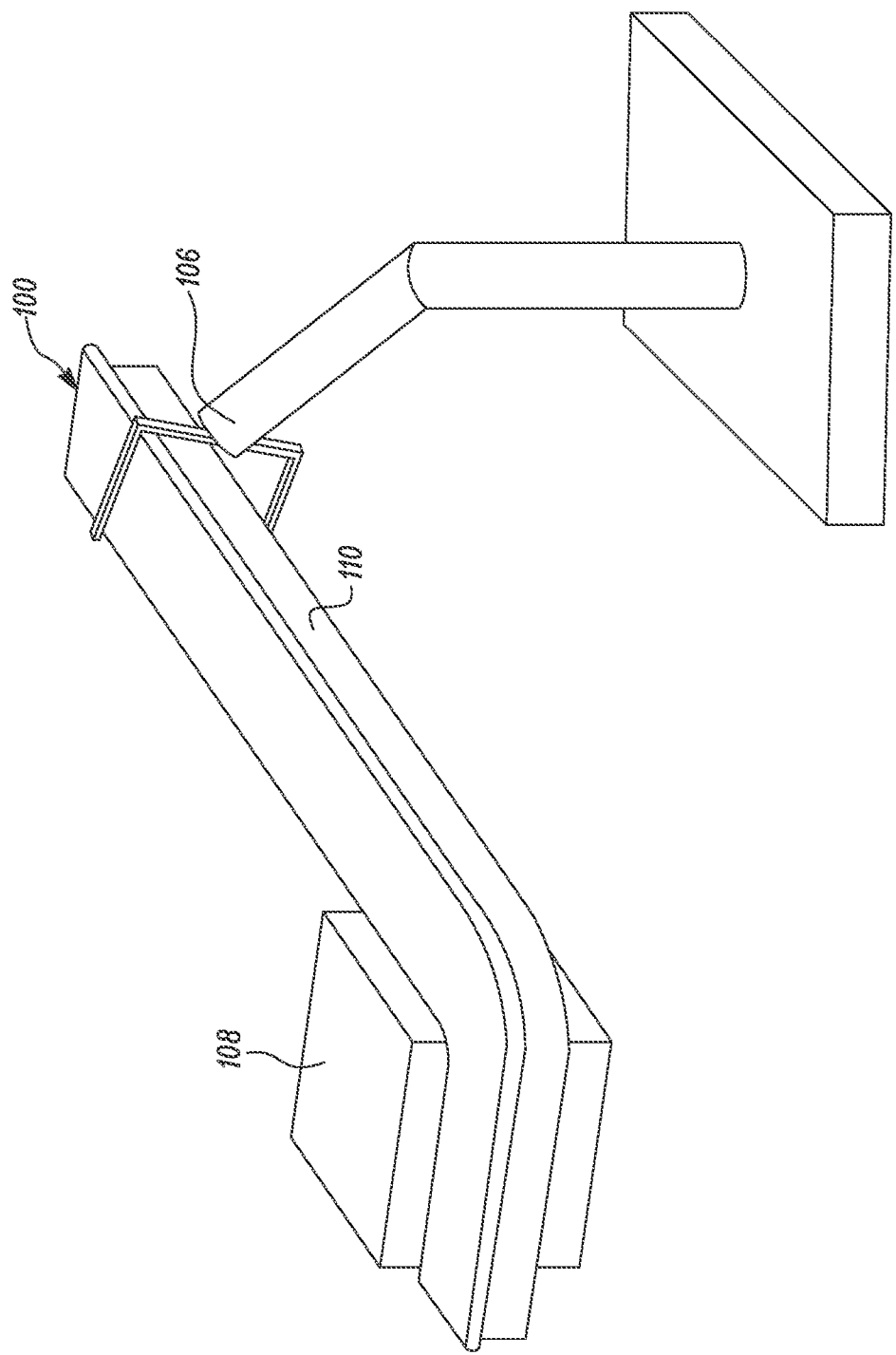
FIG. 2 illustrates a structural cable being manipulated by a robotic arm to position the structural cable so as to avoid an object according to certain embodiments of the current invention.

The structural cable 100 also preferentially includes a structural element 104. The structural element 104 is configured to provide a pre-determined amount of rigidity to the structural cable 100 so that the structural cable 100 can be handled by a robotic arm 106 as shown in FIG. 2. Further, as shown in FIG. 2, the structural element 104 is pliable so that it may be manipulated by the robotic arm, or another machine before being handled by the robotic arm. Once formed into the desired structure, robotic arm 106 may pick up and place the structural cable in the desired location to avoid other objects and obstructions, like object 108 in FIG. 2. The structural element 104 imparts sufficient rigidity to the structural cable 100 to cause the cable to retain its shape after being bent and subsequent placement, as well as during robotic arm motion after pick-up, handling, and placement. In other embodiments, bends and other structural features may be imparted through the movement of the robotic arm. For example, when the robotic arm moves it impart sufficient force to plastically deform the structural cable in a desired manner. That is during the movement of the structural cable by the robotic arm, a desired bend may be placed into the structural cable.

Structural element 104 may be a strip or a bar of metal, e.g., iron, steel, stainless steel, aluminum, copper, tin, or nickel at a thickness so as to provide structural support but allow for manipulation (for example cold bending) into different geometries. For example, structural element 104 may be a 1.5 mm thick bar of copper. The structural element 104 may be cold rolled prior to installation by the robotic arm 106 or cold rolled by the robotic arm 106 itself. Besides pure metals, the structural element 104 may be formed from other materials including, but not limited to, alloys that exhibit suitable ductility in providing the adequate amounts of flexibility and rigidity. Structural element 104 may also be non-metallic. For example, the structural element may be made of a monomer, polymer, or hybrid polymer-metal composite. Exemplary polymers include silicone polyethylene complex polymers, which can be malleable as well as retain form, homopolymer high density polyethylene (HDPE), which can achieve good plastic deformation retention, or another polymer. To form specific bends and geometries, localized heat may be used to thermoplastically deform the polymer. An exemplary polymer-metal composite is copper and iron nanoparticles embedded in polyvinylchloride. Other structural elements may also be used as long as they may be formed or deformed into the desired structure.

Figure 14:
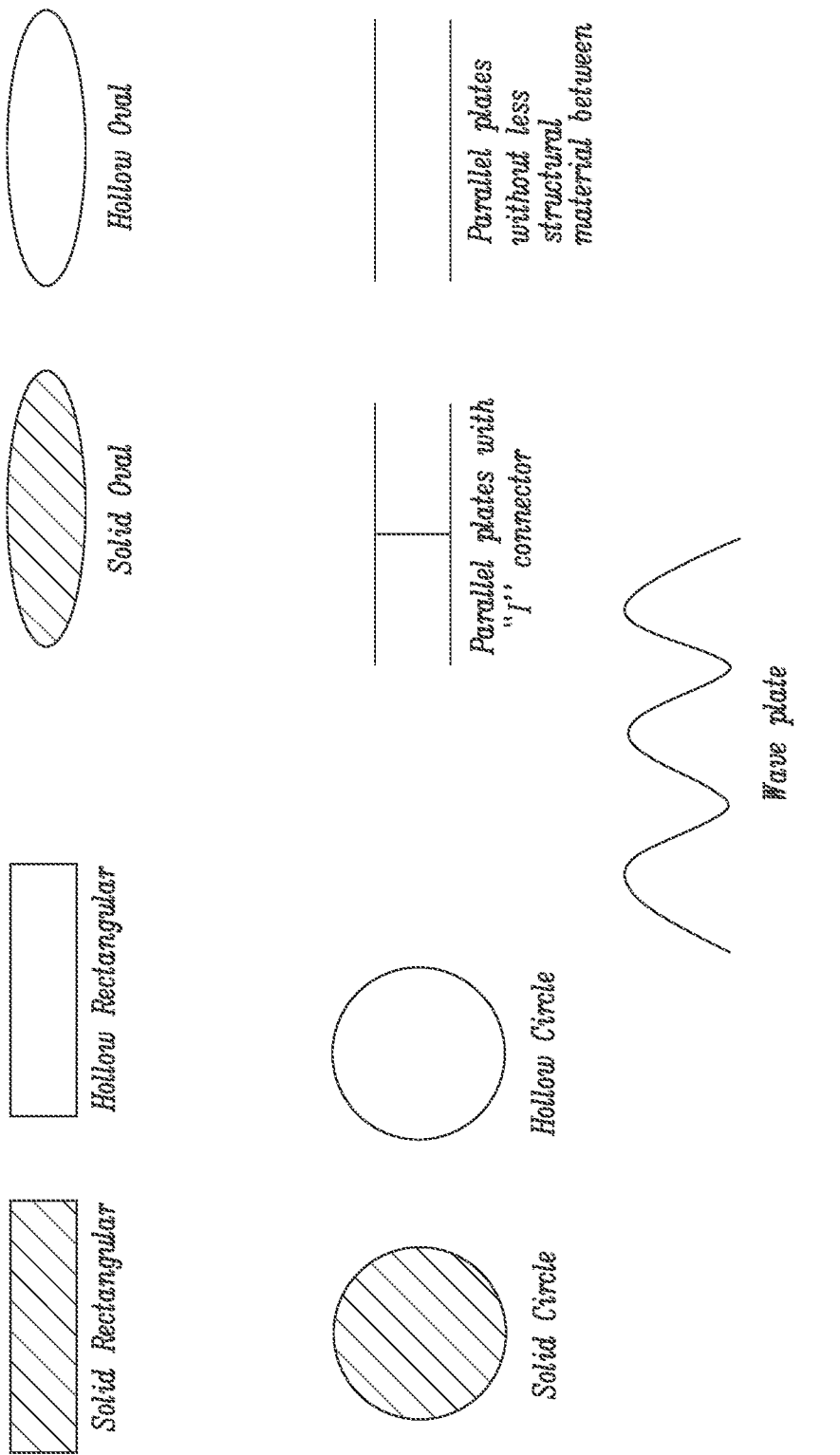
FIG. 14 illustrates structural-element cross sections according to certain embodiments of the current invention.

Further, the cross section of the structural element 104 may vary. It may be rectangular as shown in FIG. 1A, square, oval, circular, or another geometry. In one embodiment, structural element 104 is a very thin extruded metallic bar or cylinder that is hollow in order to achieve maximum stiffness per unit weight per unit cost per unit volume. In another embodiment, structural element 104 is a wave plate achieving multi-directional stiffness, even though the structural element 104 is only positioned at the bottom portion or top portion of the structural cable 100. The cross section of exemplary structural elements is shown in FIG. 14. In certain embodiments, the structural integrity of the structural element may vary along the length, or in one of the other dimensions. For example, the structural element may contain finer or courser grains (due to for example, heat treatment) to vary the properties of the structural element. In other embodiments, UV-light, heat treatment, or another technique may be used to alter the structure of the structural element. For example, UV-light may polymerize, further polymerize, cross link, further cross link, or otherwise increase the structural integrity of the structural element in certain regions. In other embodiments, UV-light, ozone, heat treatment, aging, or another technique may be used to degrade the structural element along the entire length, or in selective regions. This may be advantageous in instances when the structural integrity of the structural cable needs to change, for example, during removal after it has been connected in an automobile or to help route the structural cable around a structure that must be placed in a nearby vicinity.

Figure 15:
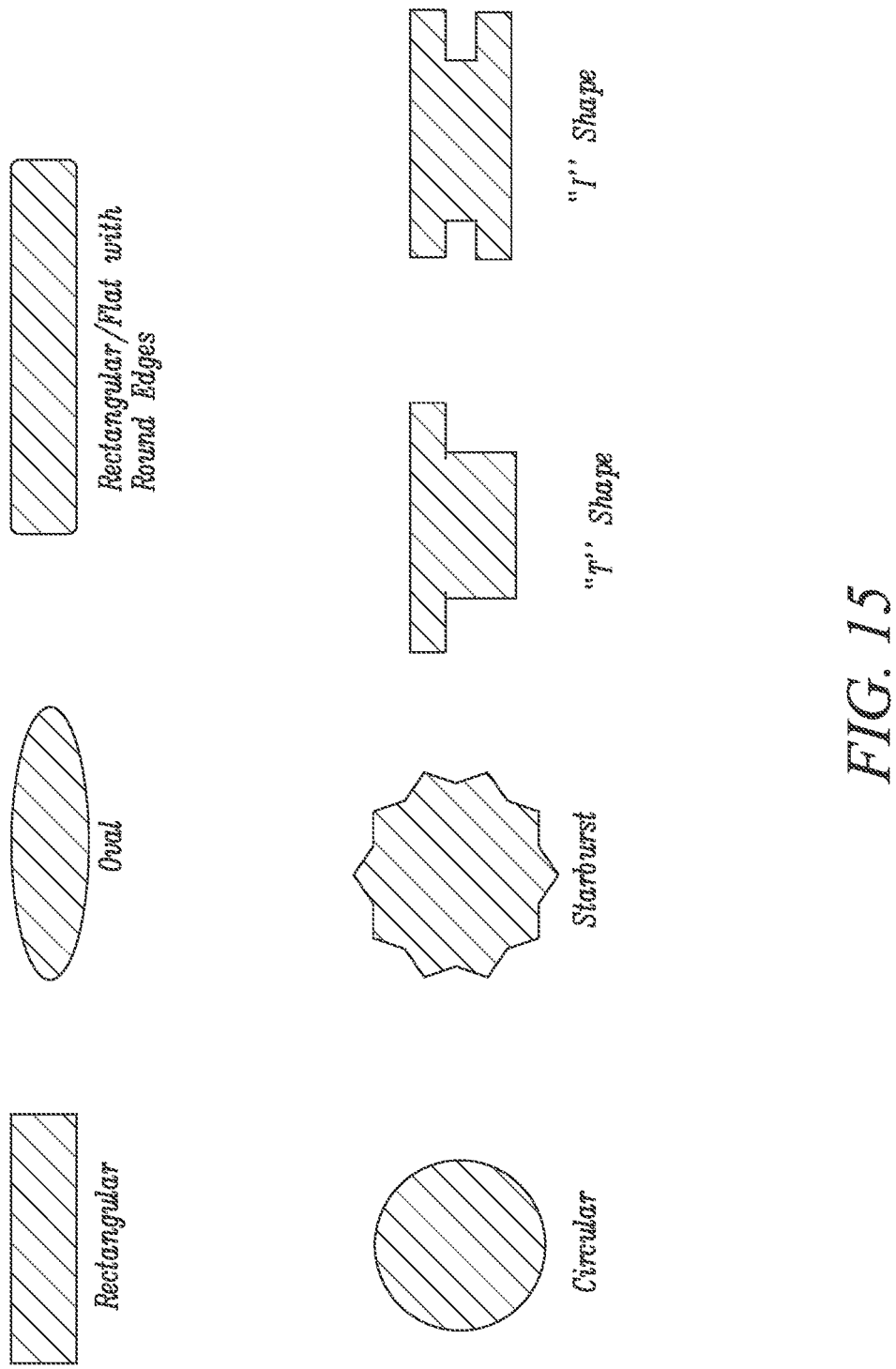
FIG. 15 illustrates body cross sections according to certain embodiments of the current invention.

Further, the structural cable 100 also includes a body 110 that is formed around each of the wires/conductors 102*a-f* and may be formed around the structural element 104, as shown in FIG. 1A. Although a "T" geometry is shown for the body, it may have different geometries, including a flatter geometry or an oval-shaped geometry. These and other cross-sections may be used to create non-uniform signal integrity characteristics (including impedance) of the wires/conductors. Exemplary body cross sections are shown in FIG. 15.

In certain embodiments, the structural integrity of the body may vary along the length, or in any of the other dimensions. In certain embodiments, UV-light, heat treatment, or another technique may be used to alter the structure of the body. For example, UV-light may polymerize, further polymerize, cross link, further cross link, or otherwise increase the structural integrity of the body in certain regions. In other embodiments, UV-light, ozone, heat treatment, aging, or another technique may be used to degrade the body along the entire length, or in selective regions. This may be advantageous in instances when the structural integrity of the body needs to change, for example, during removal after it has been connected in an automobile or to help route the structural cable around a structure that must be placed in a nearby vicinity.

The body 110 is preferentially made of a non-conducting material and may be a dielectric. For example, the body 110 may be made from a dielectric thermoplastic polymer, such as polyvinylidene fluoride (PVDF), a dielectric thermoplastic elastomer (TPE), such as polyurethane (PUR), ethylene propylene rubber (EPR), or another suitable polymer or material. The body many also be formed of monomers (or shorter-chain polymers) that may be treated either during cable formation or after cable formation to alter the properties of the body. For example, ultraviolet light, a heat treatment, or application of a solvent, may cause additional polymerization in certain areas of the body to alter the properties of the body, such as stiffness, yield strength, hydrophobicity, or another property. The body 110 may be formed through an extrusion process, as described more in reference to FIG. 3. Body 110 may also be formed through a lamination process. During lamination, the structural member, wires (or conductors), and one or more layers of the non-conducting outer material body may be added as layers, then hot pressed to form the structured cable.

In certain embodiments of the present disclosure, a thickness 't' of the body 110 may be in the range of 0.1 millimeter to 10 centimeter. For example, the thickness T of the body 110 may be 0.5 millimeter. In another example, the thickness 't' of the body 110 may be 2 millimeters. It may be noted that the thickness 't' of the body 110 may be suitably selected depending on factors such as an inter-relative sizing of the wires/conductors 102 and the structural element 104 and other specific requirements of an application such as relative motion based wear and tear anticipated or environment based performance requirements.

Figure 1B:
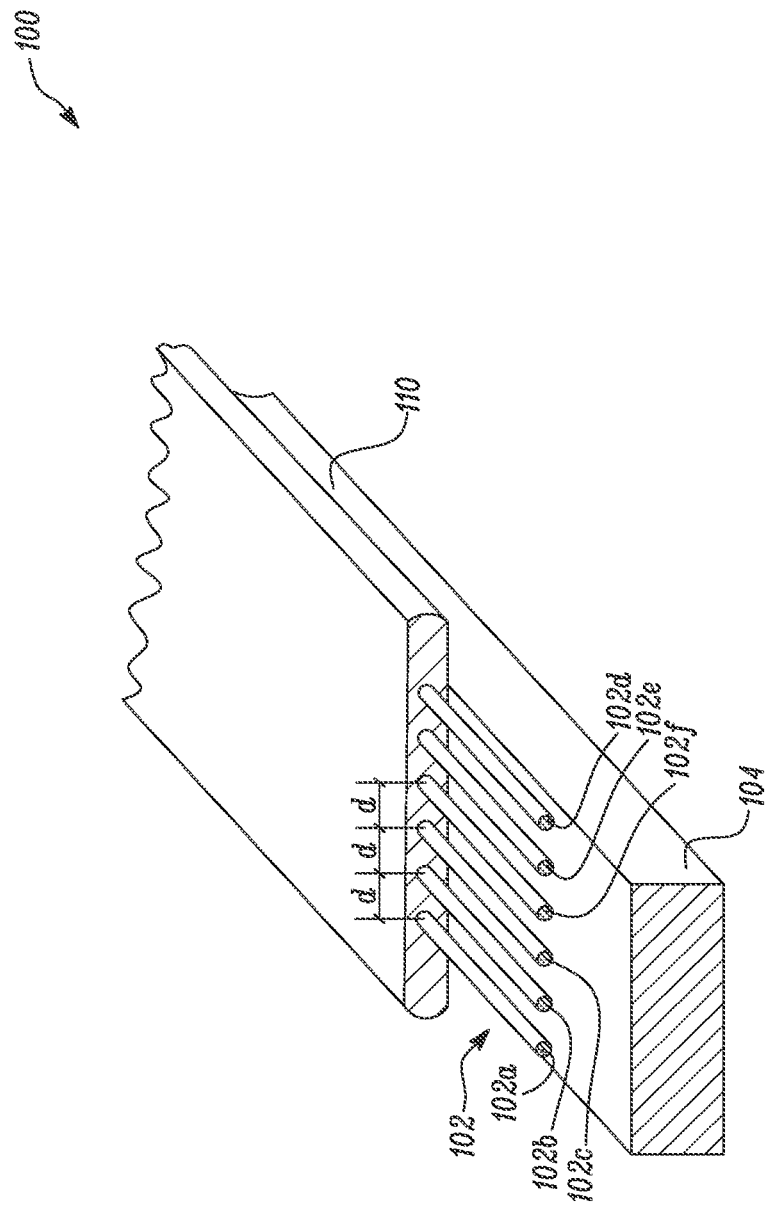
FIG. 1B illustrates a perspective-sectional view of a structural cable showing a body with multiple wires arranged in a flat configuration and located alongside a structural element external to the body according to certain embodiments of the current invention.

In certain embodiments, the structural element may not be embedded, but rather be partially or fully external to the body 110 as shown in FIG. 1B. as an external structure. The structural element 104 may be a bar, as shown in FIG. 1B, or it may be a hollow tube, solid tube, parallel plate, wave plate, or other structural element. FIG. 14 shows exemplary structural-element cross sections. Structural element 104 may consist of metal, such as, iron, steel, stainless steel, aluminum, copper, tin, or nickel at a thickness so as to provide structural support but allow for manipulation (for example cold bending) into different geometries. For example, structural element 104 may be a 1.5 mm thick bar of copper. The structural element 104 may be cold rolled prior to installation by the robotic arm 106 or cold rolled by the robotic arm 106 itself. Besides pure metals, the structural element 104 may be formed from other materials including, but not limited to, alloys that exhibit suitable ductility in providing the adequate amounts of flexibility and rigidity. Structural element may also be non-metallic. For example, the structural element may be made of a monomer, polymer, or hybrid polymer-metal composite. Exemplary polymers include silicone polyethylene complex polymers, which can achieve malleability as well as form retention, homopolymer high density polyethylene (HDPE), which can achieve good plastic deformation retention, or another polymer. For forming, localized heat may be used to thermoplastically deform the polymer. An exemplary polymer-metal composite is copper and iron nanoparticles embedded in polyvinylchloride. Other structural elements may also be used as long as they may be formed or deformed into the desired structure.

The cross section of the structural element 104 may vary. It may be rectangular as shown in FIG. 1A, square, oval, circular, or another geometry. In one embodiment, structural element 104 is a very thin metallic bar or cylinder that is hollow in order to achieve maximum stiffness per unit weight per unit cost per unit volume. In another embodiment, structural element 104 is a wave plate achieving multi-directional stiffness, even though the structural element 104 is only positioned at the bottom portion or top portion of the structural cable 100. The cross section of exemplary structural elements is shown in FIG. 14.

In certain embodiments, the structural integrity of the structural element may vary along the length, or in one of the other dimensions. For example, the structural element may contain finer or courser grains (due to for example, heat treatment) to vary the properties of the structural element. In other embodiments, UV-light, heat treatment, or another technique may be used to alter the structure of the structural element. For example, UV-light may polymerize, further polymerize, cross link, further cross link, or otherwise increase the structural integrity of the structural element in certain regions. In other embodiments, UV-light, ozone, heat treatment, aging, or another technique may be used to degrade the structural element along the entire length, or in selective regions. This may be advantageous in instances when the structural integrity of the structural cable needs to change, for example, during removal after it has been connected in an automobile or to help route the structural cable around a structure that must be placed in a nearby vicinity.

Figure 3:
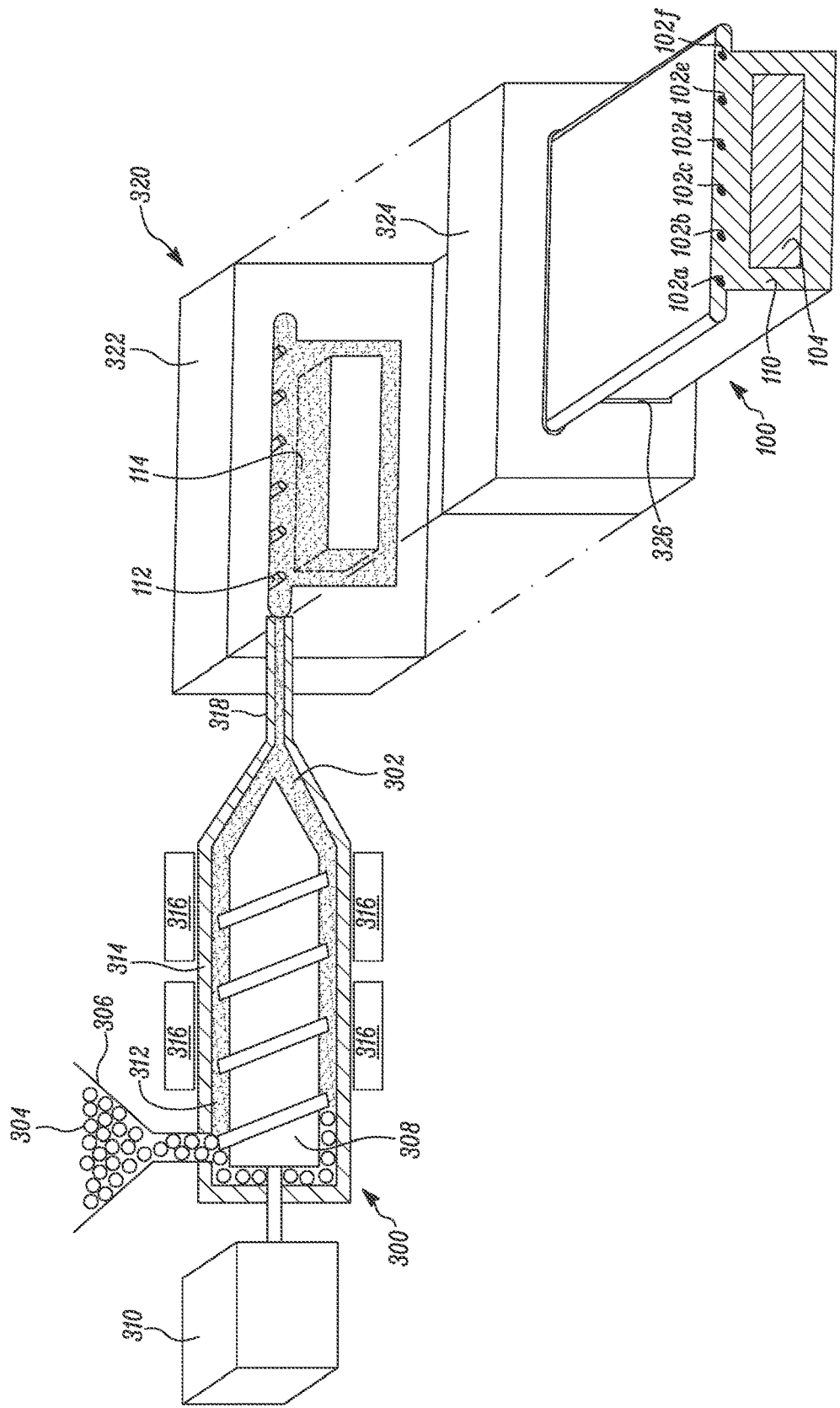
FIG. 3 illustrates an extrusion process for manufacturing the structural cable of FIG. 1A according to certain embodiments of the current invention.

FIG. 3 illustrates an extrusion process for manufacturing the structural cable 100 of FIG. 1A according to a certain embodiment of the current invention. Referring to FIG. 3, the body 110 is extruded using mold 320 from an extrudate 302 (typically a polymer as discussed above). As shown in FIG. 3, raw materials 304 (such as polymer beads) may be fed into a hopper 306 of an extruder 300. The extruder 300 has a screw-rod 308 that is operatively rotated by a motor 310 to homogenize the raw materials 304 by mixing the raw materials 304 within an annular chamber 312 of the extruder 300 located between a casing 314 of the extruder 300 and the screw-rod 308. Rotation of the screw-rod 308 also propels the homogenized raw materials 304 in a forward direction so that the homogenized raw materials 304 may be subject to heat from one or more heaters 316 disposed around the annular chamber 312 of the extruder 300. When subject to heat, the homogenized raw materials 304 become liquid and flow capable for forming the extrudate 302. The extrudate 302 is then ejected from a nozzle 318 and made to flow into a mold 320 under pressure exerted by the forward direction push of the screw-rod 308 or a hydraulic or pneumatic or electric piston (not shown).

The mold 320 may comprise two or more portions that are separable from one another along one or more parting lines of the mold 320. For instance, as shown in the illustrated embodiment of FIG. 3, the mold 320 consists of two portions 322, 324 that can be operatively moved in relation to one another for opening and closing the mold 320. When in use, the two portions 322, 324 of the mold 320 may be closed with one another. A feeder (not shown) may continuously supply the wires/conductors 102a-f (more or fewer wires/conductors, twisted wire/conductor pairs, or coaxial wire pairs) and the structural element 104 into the mold 320 via appropriate openings (not shown). In certain embodiments, the structural element may not be fed continuously, for example to facilitate bending or flexibility in those areas.

Figure 5:
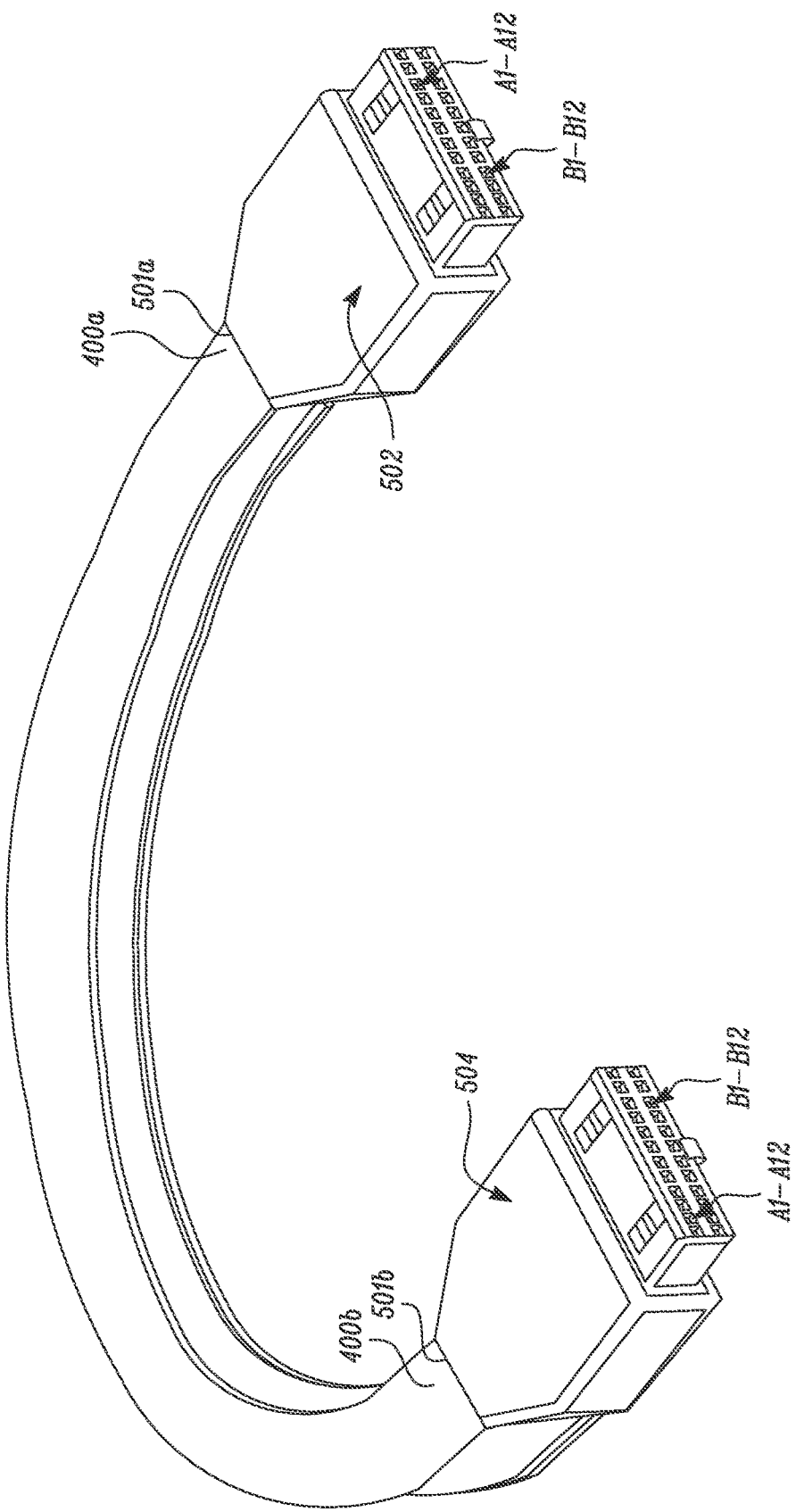
FIG. 5 illustrates the structural cable of FIG. 4 showing a pair of connectors disposed at ends of the structural cable and showing multiple pins disposed within each of the connectors according to certain embodiments of the current invention.

The extrudate 302 is made to flow into the mold 320 together with the continuous passage of the wires/conductors 102a-f and the structural element 104 into the mold 320. The openings in the mold 320 positions the structural element 104 and the wires/conductors in their respective positions within the mold 320 while the extrudate 302 solidifies around an outer surface 112 of each wire/conductor and an outer surface 114 of the structural element 104 respectively. This way, the body 110 of the structural cable 100 is formed integrally with the wires/conductors 102a-f and the structural element 104, each of which is now located within the body 110 of the structural cable 100. However, in certain embodiments, the structural element is not embedded within the body 110, but is either only partially embedded in the body 100 or external to body 110. The formed structural cable 100 is then extruded out of the mold 320 through an outlet 326 and is ready for being connected to a pair of connectors, for example the connectors that are shown in FIG. 5, the connector shown in FIG. 13A, or a USB-C connector.

The body 110 may be extruded such that the cross section of body varies throughout the length to impact different structural properties to the body, including varying stiffness and tensile strength. For example, the body may be varying circular diameters, changing in diameter to impart different stiffness or other properties into the structural cable. The cross section of the structural element may also impart more stiffness (or other property) onto the structural element. For example, a starburst cross-section (or a larger diameter) at certain lengths of the structural element can be used to increase the stiffness of the structural element along those lengths. In this manner, the body itself may act partially or wholly as the structural element. Exemplary body cross sections are shown in FIG. 15.

In certain embodiments, the structural integrity of the body may vary along the length, or in any of the other dimensions. In certain embodiments, UV-light, heat treatment, or another technique may be used to alter the structure of the body. For example, UV-light may polymerize, further polymerize, cross link, further cross link, or otherwise increase the structural integrity of the body in certain regions. In other embodiments, UV-light, ozone, heat treatment, aging, or another technique may be used to degrade the body along the entire length, or in selective regions. This may be advantageous in instances when the structural integrity of the body needs to change, for example, during removal after it has been connected in an automobile or to help route the structural cable around a structure that must be placed in a nearby vicinity.

In certain embodiments, the outlet 326 rotates (for example, in the same plane as the wide dimension of the extruded cable) to facilitate bending of the structural cable 100. Facilitating bending in this manner typically retains the wire-to-wire distances, which is desirable to maintain electrical characteristics within the wires/conductors and between different wires/conductors. Cold bending after the structural cable is formed may cause changes to the wire/conductor spacing which is undesirable (for example, cross talk between certain wires/conductors may be more likely to occur or wire/conductor impedance may change).

In other embodiments, additional materials may be added, deposited, or coated on the outer surface of the body 110 through another feed nozzle, or via another method, after the outer surface of the body 110 is sufficiently cool after the outlet 326. These materials may be structural materials that provide stiffness and/or tensile strength and may be coated by another feed nozzle, or through deposition, dip coating, solution casting, or other method. In such cases, the structural element 104 may be small, or may not be extruded at all with the body and wires/conductors. That is, the post-extrusion coating will provide sufficient stiffness to the structural cable, absent the structural element.

In certain embodiments, after outlet 326, wires/conductors may also be windowed or stripped of raw materials 304 that form the outer layer 410 (and any other materials covering the conductive element) for attachment to certain connectors. Wires/conductors may also be crimped for attachment to other connectors. Also after outlet 326, portions of the structural element 104 that is was coextruded with the body and is either embedded or external to the body, can be selectively removed by conventional processes to enable non-constant structural integrity.

Further, the outer surface may be selectively coated, or reacted, to cause changes in mechanical properties, including the stiffness. For example, heat treatment, ozone, dip coating, or laser techniques may be used. In certain embodiments, the raw materials 304 may be monomers (or shorter-chain polymers) that may be treated either during cable formation or after cable formation to alter the properties of the body. For example, ultraviolet light, a heat treatment, or application of a solvent, may cause polymerization of monomers, or additional polymerization (or cross linking) of already existing polymers in certain areas of the body to alter the properties of the body, such as stiffness, yield strength, hydrophobicity, or another property. In other embodiments, the properties of the outer coating may be designed to degrade. For example, the outer coating may be exposed to heat treatment, ozone, laser techniques, allowed to age over time, or other method to degrade over time to alter the mechanical properties, including the stiffness or tensile strength.

Although FIG. 3 shows the co-extrusion of wires/conductors and the structural element into the mold 320, the wires/conductors and the structural element 104 may be passed, via appropriate openings, into the mold 320 in a batch-wise manner with intermittent stops or gaps in the passage of the wires/conductors and/or structural cable. The intermittent stops may be beneficial to allow sufficient time to the extrudate 302 to solidify around the outer surfaces 112, 114 of each of the wires/conductors and the structural element. These stops or gaps may also cause stiffness changes to facilitate bending during, or after, structural cable formation along the length of the structural cable or at certain specific regions. For example, if the structural element is not extruded for a section, the structural cable 100 will be less rigid and more flexible in this region. One or more flexible portions may be placed into the structural cable to create slack to facilitate a connection between the connector and the receptacle. Other ways of carrying out the extrusion process as will be appreciated by persons skilled in the art.

Further, wires/conductors, structural element (either fully or partially encased inside body), and body may also be formed through a lamination process. During lamination, the structural member, wires (or conductors), and one or more layers of the non-conducting outer material body may be added as layers, then hot pressed to form the structured cable.

Figure 4:
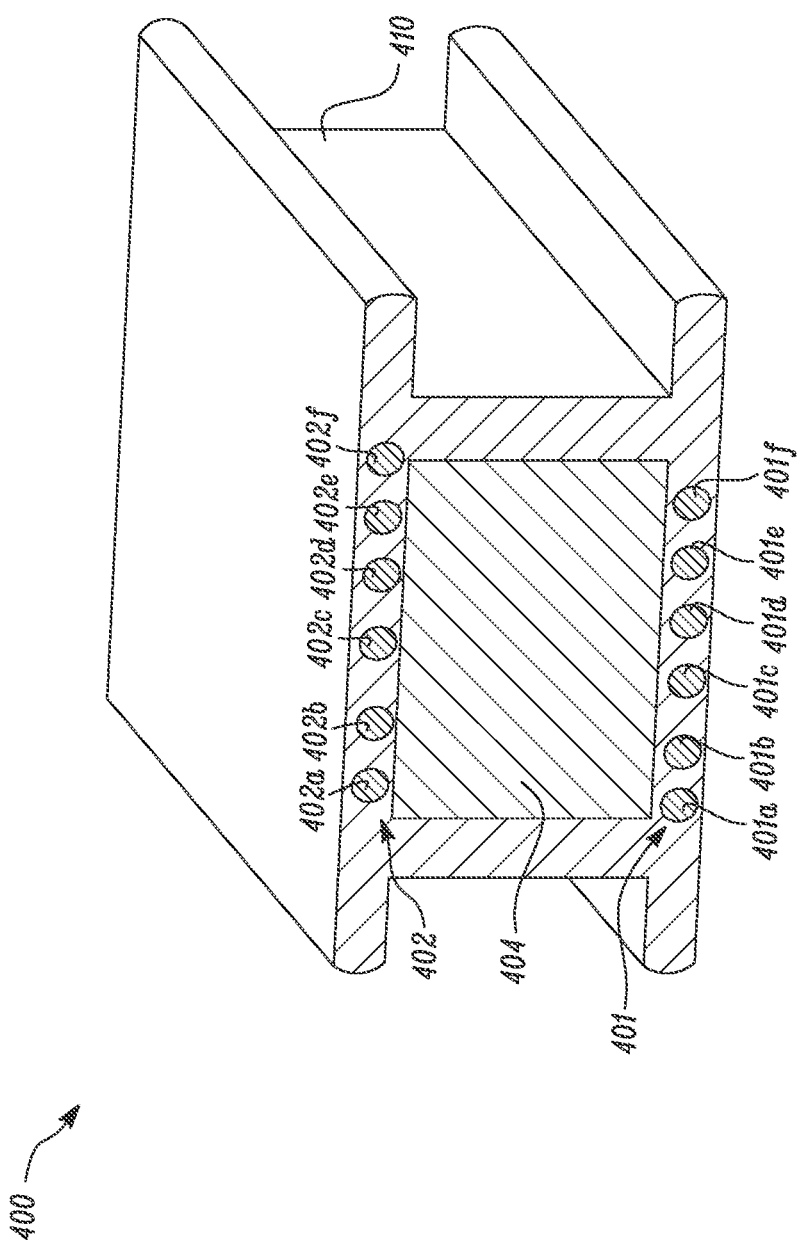
FIG. 4 illustrates a perspective-sectional view of the structural cable showing a first set of wires and a second set of wires located on opposite sides of the structural element according to certain embodiments of the current invention.

FIG. 4 illustrates a perspective sectional view of a structural cable 400 showing a first set of wires/conductors 401a-f and a second set of wires/conductors 402a-f. The first and second sets of wires/conductors are formed in a collinear manner as shown in FIG. 4. In other embodiments, there may be fewer or greater than six wires/conductors in each set and the sets of wires/conductors need not be collinear. However, it is desirable to have the wire/conductor geometry set for ease of attachment of the end connectors (as discussed later). Further, the structural cable may contain multiple wires/conductors disposed together (such as twisted wire/conductor pairs) instead of a single wire/conductor at the indicated locations. In other embodiments, multiple wires/conductors (for example a pair of wires/conductors) may be coaxial wrapped. In other embodiments, multiple wires or conductors may be twisted together through the length of the structural cable with the ends fanned out into a collinear orientation (that is the wires or conductors may exist in different orientations throughout the bulk, but the ends will be collinear).

As shown in FIG. 4, the first set of wires/conductors 401a-f and the second set of wires/conductors 402a-f is incorporated within the body 410 of the structural cable 400, with the first and second sets of wires/conductors on opposite sides of the structural elements. The wire/conductor pairs may also be disposed to the side of the structural element, or on the same side of the structural element (for example, with one set of wires/conductors disposed on top of the other set of wires/conductors forming a "double-decker" configuration). Wires/conductors within the first and second set of wires/conductors may be able to carry power transmission or data transmission as will be discussed below. In other embodiments, the "double decker" configuration may be such that the sets of wires/conductors are on the same side of the structural element. In other embodiments, the wires may be oriented on three sides, or all sides, of the structural element. For example, the wires may be arranged in a circular manner around a structural element with a circular cross section, or alternatively, the wires may be arranged partially around a structural element with a circular cross section.

The structural element 404 may be a bar, as shown in FIG. 1B, or it may be a hollow tube, solid tube, parallel plate, wave plate, or other structural element. FIG. 14 shows exemplary structural-element cross sections. Structural element 104 may consist of metal, e.g., iron, steel, stainless steel, aluminum, copper, tin, or nickel at a thickness so as to provide structural support but allow for manipulation (for example cold bending) into different geometries. For example, structural element 404 may be a 1.5 mm thick bar of copper. The structural element 404 may be cold rolled prior to installation by the robotic arm 106 or cold rolled by the robotic arm 106 itself. Besides pure metals, the structural element 404 may be formed from other materials including, but not limited to, alloys that exhibit suitable ductility in providing the adequate amounts of flexibility and rigidity. Structural element 404 may also be non-metallic. For example, silicone polyethylene complex polymers may be used and can achieve malleability as well as form retention. Other polymers, such as homopolymer high density polyethylene (HDPE) may also be used and achieve good plastic deformation retention. For forming, localized heat may be used to thermoplastically deform the polymer. Other structural elements may also be used as long as they may be formed or deformed into the desired structure.

Body 410 may be formed through an extrusion process as described in FIG. 3. Body 410 may also be formed through a lamination process or another process. During lamination, the structural member, wires (or conductors), and one or more layers of the non-conducting outer material body may be added as layers, then hot pressed to form the structured cable.

Further, the cross section of the structural element 404 may vary. It may be rectangular as shown in FIG. 4, square, oval, circular, or another geometry. In one embodiment, structural element 404 is a very thin metallic bar or cylinder that is hollow in order to achieve maximum stiffness per unit weight per unit cost per unit volume. In another embodiment, structural element 404 is a wave plate achieving multi-directional stiffness, even though the structural element 404 is only positioned at the bottom portion or top portion of the structural cable 400. The cross section of exemplary structural elements is shown in FIG. 14.

In certain embodiments, the structural integrity of the structural element may vary along the length, or in one of the other directions. For example, the structural element may contain finer or courser grains (due to for example, heat treatment) to vary the properties of the structural element. In other embodiments, UV-light, heat treatment, or another technique may be used to alter the structure of the structural element. For example, UV-light may polymerize, further polymerize, cross link, further cross link, or otherwise increase the structural integrity of the structural element in certain regions. In other embodiments, UV-light, ozone, heat treatment, aging, or another technique may be used to degrade the structural element along the entire length, or in selective regions. This may be advantageous in instances when the structural integrity of the structural cable needs to change, for example, during removal after it has been connected in an automobile or to help route the structural cable around a structure that must be placed in a nearby vicinity.

FIG. 5 illustrates a perspective view of the structural cable 400 from FIG. 4 showing a pair of connectors 502, 504 disposed at ends 400a, 400b of the structural cable 400 according to a certain embodiment of the current invention. As shown, a first one of the connectors 502 includes multiple pins therein. Similarly, a second one of the connectors 504 includes multiple pins therein. In the illustrated embodiment of FIG. 5, the pins associated with the first connector 502 and the pins associated with the second connector 504 have been arranged linearly within respective ones of the first and second connectors 502, 504. For instance, a first row and a second row, each having 12 pins (A1-A12 and B1-B12), is shown to be associated with the connector 502 while a first row and a second row, each having 12 pins (A1-A12 and B1-B12), is shown to be associated with the connector 504.

Although the pair of connectors 502, 504 are shown as female connectors, one or both of the connectors 502, 504 may be male connectors. Other connectors may be connected to the structural cable such as a USB-C connector, or the connector shown in FIG. 13. Moreover, although each pin from each of the first and second connectors 502, 504 in FIG. 5 is shown to be similar to one another, in other embodiments, one or more pins from a given connector 502/504 may be dissimilar to one another depending on various factors including, but not limited to, a type of wire/conductor that is used to connect with the pins present in the given connector 502/504, a function associated with the given wire/conductor i.e., data transmission or power transmission, and/or a type of port that is used to facilitate a connection with respective ones of the first and second connectors 502, 504. In certain embodiments, instead of pins, a connector may contain thongs (i.e., metal fingers), pads, the wires/conductors themselves, a socket, or another connection structure.

Figure 13B:
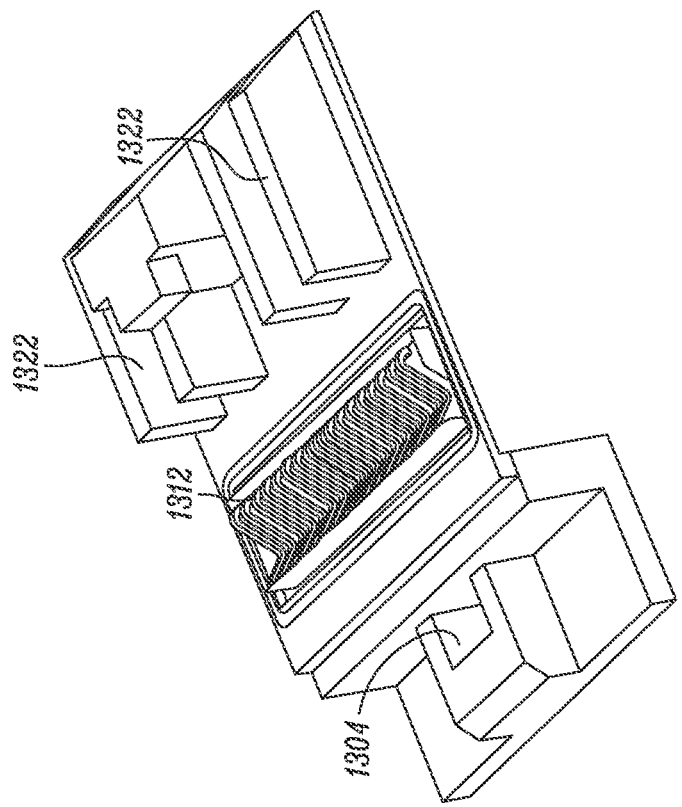
FIG. 13B illustrates a receptacle that may connect to the flat connector shown in FIG. 13A according to certain embodiments of the current invention.
Figure 13A:
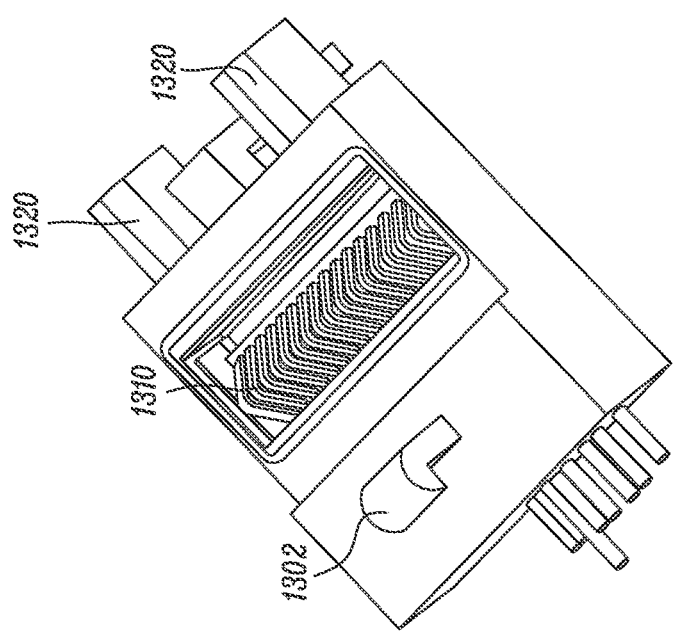
FIG. 13A illustrates a flat connector that may connect to the structural cable according to certain embodiments of the current invention.

One exemplary connector is the flat connector shown in FIG. 13A. The connector consists of a flat, single row of contacts. The connector may be connected to the structural cable via traditional solder, laser solder, via crimping, or via another connection method. An important aspect of the connector is that connector body and retention features preferentially have self-aligning elements (such as a notch or a keying structure) for automated assembly. As shown in FIG. 13A, hook 1302, and guide elements 1320 operate as self-aligning elements. Hook 1302 is designed to be inserted into acceptor region 1304 of the receptacle shown in FIG. 13B. Guide elements 1320 are designed to be inserted into accepting elements 1322 of the receptacle shown in FIG. 13B. The hook 1302 or guide elements 1320 may function separately as self-aligning elements (that both features are not required to self-align). Other self-alignment elements may also be used. Further, the spacing between the pins (i.e., the pitch) may be varied. For example, the spacing may be varied to optimize signal integrity on high-frequency carriers and minimize space on power and low-frequency pins. The connector pin or pins connected to ground may share a single conductor with the ground and be terminated in the shield of the connector. Connector itself is sealed, typically to a level that corresponds to a IEC standard 60529 rating of IP57 or better. That is the connector has at least limited protection form dust affecting the operation of the connector and protection against immersion into water of up to one meter in depth.

Connector pins 1310 are an "inverted-V" shape or open-triangle shape as shown in FIG. 13A, while the receptacles pins 1312 are a "V" shape or open-triangle shape. Preferentially, the angle (of the V) formed by the pins in the connector is slightly larger than the angle (of the V) formed by the pins in the receptacle. For example, the connector pins might have a 90° angle and the receptacle pins might have an 89° angle. When connected, this difference causes a contact force to be applied to both sides of each pin. This force helps the pins in the connector and in the receptacle maintain contact with one another when vibrations occur, such as those vibrations that occur during driving an automobile. This force also helps the pins minimize contact resistance between pins 1310 and pins 1312 abetting efficient power and data transmission. The exact angles and the difference between the angles may be different as long as a contact force is applied to help maintain contact between the connector and receptacle pins.

FIG. 13B illustrates a receptacle according to certain embodiments of the present invention. The pins 1312 may be over-molded into place in a plastic guide, circumventing the need for an integrated printed circuit board (PCB). That is, the receptacle may be integrated into a PCB or other electrical component. The receptacle pins may terminate into a PCB via soldered pad connections (for example, the tip of each pin's V may be soldered to solder pad) or other connection methods. The receptacle pins 1312 as shown in FIG. 13B are a V shape to help maintain connection when vibrations are experienced as described above. The pins 1312 may be over-molded into a plastic guide that maintains their separation and prevents them from deforming. The receptacle is typically molded into a PCB as described above and then connected to a sensor, GPU/CPU, or other device/component, or otherwise connected to a sensor, GPU/CPU, or other device/component. The receptacle may connect to the connector using self-aligning elements as described above. In certain embodiments, instead of pins, connectors and receptacles have thongs (i.e., metal fingers), pads, the wires/connects themselves, a socket, or another connection method.

To make the connection between the structural cable and the connectors, the body 410 and, in certain embodiments, must terminate with the wires/conductors extending past the body. In certain embodiments, the connectors 502 and 504 are disposed to accept the structural element, in which case the connectors 502 and 504 may also extend past the body (along with the wires/conductors) on respective sides 501a and 502b. Each pin in each of the first and second connectors 502, 504 may be coupled with one or more wires/conductors included in the structural cable 400.

The connectors 502 and 504 on either end of the structural cable are preferentially allowed to be replaced when desired. That is, connectors 502 and 504 are removable from the structural cable 400. When connectors are mated with the main cable structure on either side, the resulting cable is IPX7 rated in accordance with IEC standard 60529 according to certain embodiments. That is, the structural cable can preferentially withstand accidental immersion in one meter of water for up to thirty minutes. A rim structure, one or more O-rings, a liquid gasket, cure-in-place, or form-in-place gasket or face seal, or another structure may be used to achieve the IPX7 rating. In other embodiments, the structural cable is IPX8 rated for continuous underwater use.

In certain embodiments, the mating of each connector 502/504 to the structural cable 400 has a lock and key mechanism (for example, a notch in the plug connector and a structure in the main cable structure that sits in the notch or vice versa) to allow only a single mating orientation between the plug connector and the cable structure. In certain embodiments, a mechanical feature such as a key or notch is made on the overmold area so that mating is possible only in one (normal) orientation. This lock and key mechanism may or may not co-exist with the self-aligning or retention features of the connector body mentioned above.

The mating preferentially requires a force of 10 N or less to be applied for the first 100 cycles and once mated, the mated plug connector and main cable structure preferentially can withstand a pulling force of up to 75 N for the first 100 cycles. However, more or less force may be required to mate the plug connector with the main cable structure. In other embodiments, the pulling force that the mated plug connector and main cable structure preferentially can withstand is more or less than 75 N. Structural cable 400 preferentially withstands a pulling force of at least 75 N, such that no physical damage occurs when a pulling force of at least 75 N is applied for one minute and while clamping one end of the structural cable 400.

In certain embodiments, the structural cable has resistance to rotational deformation when rotated, that is a rotation along the central axis of the structural cable yields less of a twist in the final form. For example, a 90° rotation along the central axis of the structural cable yields only a 45° of cold twist or cold bending (45° recovers, 45° adopts the new form). Similarly, a 180° twist yields a new form that is 90° offset from before. In other embodiments, the amount of rotational deformation when rotated may be more or less. In other embodiments, low-level rotations, below a certain threshold (for example, 20°) do not cause a new form, but beyond this threshold, defined forming occurs. In other embodiments, the structural cable has differing resistance to rotational deformation along the length of the structural cable.

The structural cable also may have rotational integrity. That is, in the aforementioned rotary motions, such as a 90° twist, will not change wire/conductor distances in the plane of the structural cable, nor will the twist affect the relative position of the structural element with respect to the wires/conductors. Because the relative geometries of the wires/conductors relative to one another and relative to the structural element remains the same, signal integrity and power and data transmission capabilities are also maintained. Further, the structural cable preferentially has rotational springback, such that both immediate spring-back and time-delayed spring-back, does not exceed 10% of the rotary input, for example, a 90° rotary input causing a 45° new form offset shall spring-back no more than 9° from the new 45° form state.

Differential impedance for high-speed pairs may be 90 Ohm +1-5% on the mated connector window and 45 Ohm +/−3 Ohm on cable bulk window. The rise time for TDR measurement may be 30 ps for 20% to 80%. Further, the structural cable 400 with connectors 502 and 504 preferentially tolerates a thermal shock resistance according to USCAR-21 Revision 3 specification and has a vibration resistance according to USCAR-2 Revision 6 specification. Thermal shock resistance and vibration resistance is particularly important for automobile applications in which large temperature differences may result through ambient temperature fluctuations and through operation (for example, heat generated during electric vehicle battery discharge or motor operation in a vehicle with a combustible vehicle.)

Figure 6:
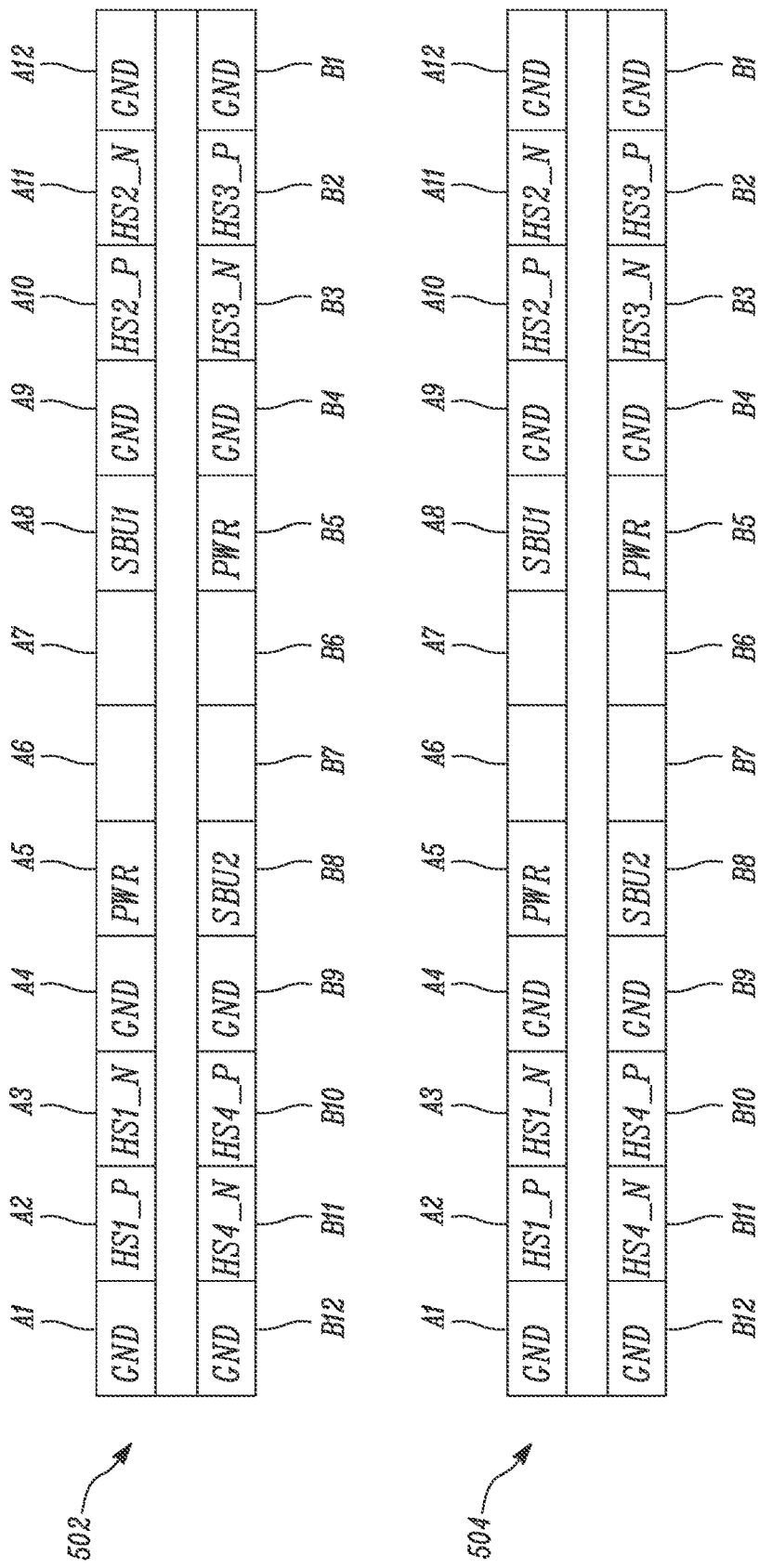
FIG. 6 is a cross-section schematic illustration of the connectors at the ends of the structural cable according to certain embodiments of the current invention.

FIG. 6 is a schematic of the pair of connectors 502, 504 connected to structural cable 400 according to certain embodiments of the current invention. As shown in FIG. 6, one of the connectors, for instance, connector 502, may have 24 pins, each of which may correspond to at least one wire 401/402 from the structural cable 400. In the illustrated embodiment of FIG. 6, pins A1, A4, A9, A12, B1, B4, B9, and B12 of connector 502 are ground pins. These pins are connected to a ground wire. Similarly, pins A5 and B5 of connector 502 are power pins that connect to a power wire. At times, certain pins may be omitted. For example, in the embodiment shown in FIG. 6, pins A6, A7, B6, and B7 are either omitted to not connect to any of wires 401/402 present in the structural cable 400. When pins are omitted, they may later be assigned and ultimately connected to wires. The arrangement of pins may change depending on the specific connector and transmission requirements.

In one embodiment, there are twelve wires (401 or 402) that connect to connectors 502 and 504 with the pin configuration shown in FIG. 6. The twelve wires consist of four pairs of wires for data transfer. These pairs are high-speed pairs that preferentially aggregate to 32.4 Gbps (raw) bandwidth for three-meter-cable length. Two wires are power and ground wires that carry up to 1 A current delivery and have DC resistances for both power and ground wires. The final two wires serve as secondary bus wires, which connect to the SBU1 and SBU2 pins (A8 and B8). These secondary bus wires may be unshielded and singled ended. Each of the wires is preferably shielded and terminated into the connector through a metal shell on each ends.

Specifically, the pins may be mapped to wires according to Table 1.

TABLE 1

| Connector #1 | | Cable Bulk | | Connector #2 | |
|---|---|---|---|---|---|
| Pin | Signal Name | Wire Number | Signal Name | Pin | Signal Name |
| A1, A4, A9, A12, B1, B4, B9, B12 | GND | 1 | GND PWR | GND | A1 A4 A9 A12 B1 B4 B9 B12 |
| A2 | HS1 P | 2 | HS1 P | A2 | HS1 P |
| A3 | HS1 N | 3 | HS1 N | A3 | HS1 N |
| A10 | HS2 P | 4 | HS2 P | A10 | HS2 P |
| A11 | HS2 N | 5 | HS2 N | A11 | HS2 N |
| A5, B5 | PWR | 12 | PWR | A5, B5 | PWR |
| B2 | HS3 P | 6 | HS3 P | B2 | HS3 P |
| B3 | HS3 N | 7 | HS3 N | B3 | HS3 N |
| B10 | HS4 P | 8 | HS4 P | B10 | HS4 P |
| B11 | HS4 N | 9 | HS4 N | B11 | HS4 N |
| A8 | SBU1 | 10 | SBU1 | A8 | SBU1 |
| B8 | SBU2 | 11 | SBU2 | B8 | SBU2 |

All of high-speed wires may be individually wrapped around to form a coaxial construction. Target impedance may be 45 Ohm +/−3 Ohm. Also, wire gauge of 28 is preferentially used for the high speed wires to achieve the required insertion loss as discussed below in reference to FIG. 8. Power and ground wires are typically sized to meet desired DC resistance and desired loop inductance. Secondary bus wires, which connect to the SBU1 and SBU2 pins are typically unshielded and singled ended. Table 2 indicates wire gauge and target impedance for the twelve wires according to certain embodiments. A thirteenth wire may be included and act as a shield (but without target gauge or impedance).

TABLE 2

| Wire Number | Signal Name | Wire Gauge | Target Impedance |
| --- | --- | --- | --- |
| 1 | GND PWR | 22-28 | NA |
| 2 | HS1 P | 28 | 45 Ohm |
| 3 | HS1 N | 28 | 45 Ohm |
| 4 | HS2 P | 28 | 45 Ohm |
| 5 | HS2 N | 28 | 45 Ohm |
| 6 | HS3 P | 28 | 45 Ohm |
| 7 | HS3 N | 28 | 45 Ohm |
| 8 | HS4 P | 28 | 45 Ohm |
| 9 | HS4 N | 28 | 45 Ohm |
| 10 | SBU1 | 34 | 45 Ohm |
| 11 | SBU2 | 34 | 45 Ohm |
| 12 | PWR | 22-28 | 10-30 Ohm |
| 13 | Shield | NA | NA |

In certain embodiments, the DC resistance for power and ground paths shall meet the requirements specified in Table 3 for both stationary mode and vibrational/thermal (i.e., drive) mode to ensure that the IR drop across the cable assembly shall be 700 mV or less for a 1 A power delivery. Preferentially, the DC resistance in the vibrational/thermal mode is <=5 Ohm for each of high-speed signals, and <=10 Ohm for the SBU signals.

TABLE 3

| Signal Name | DCR, Max in stationary | DCR, Max under vib/thermal |
| --- | --- | --- |
| GND | 100 mOhm | 200 mOhm |
| HS0_P | 2.5 Ohm | 5 Ohm |
| HS0_N | 2.5 Ohm | 5 Ohm |
| HS1_P | 2.5 Ohm | 5 Ohm |
| HS1_N | 2.5 Ohm | 5 Ohm |
| HS2_P | 2.5 Ohm | 5 Ohm |
| HS2_N | 2.5 Ohm | 5 Ohm |
| HS3_P | 2.5 Ohm | 5 Ohm |
| HS3_N | 2.5 Ohm | 5 Ohm |
| SBU0 | 5 Ohm | 10 Ohm |
| SBU1 | 5 Ohm | 10 Ohm |
| PWR | 200 mOhm | 500 mOhm |

Figure 8:
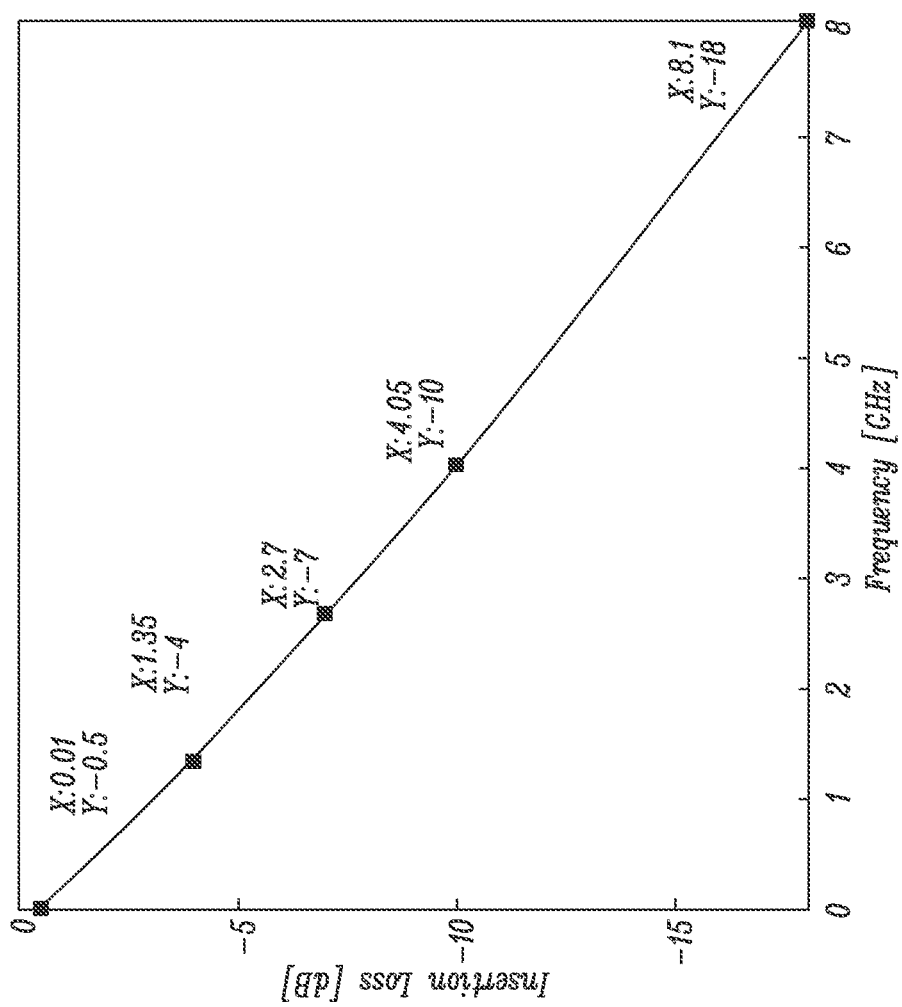
FIG. 8 is a plot of the maximum insertion loss experienced by the high-speed wire pairs with reference normalized to 90-Ohm, differential, according to certain embodiments of the current invention.

In certain embodiments, as shown in FIG. 8, all high-speed pairs shall meet the following insertion loss requirements with reference normalized to 90-Ohm, differential. As shown in FIG. 8, the insertion loss shall be no greater than 4 dB@1.35 GHz, 7 dB@2.7 GHz, and 10 dB@4.05 GHz for the Nyquist frequencies of HBR, HBR2, and HBR3 rates, respectively.

Figure 9:
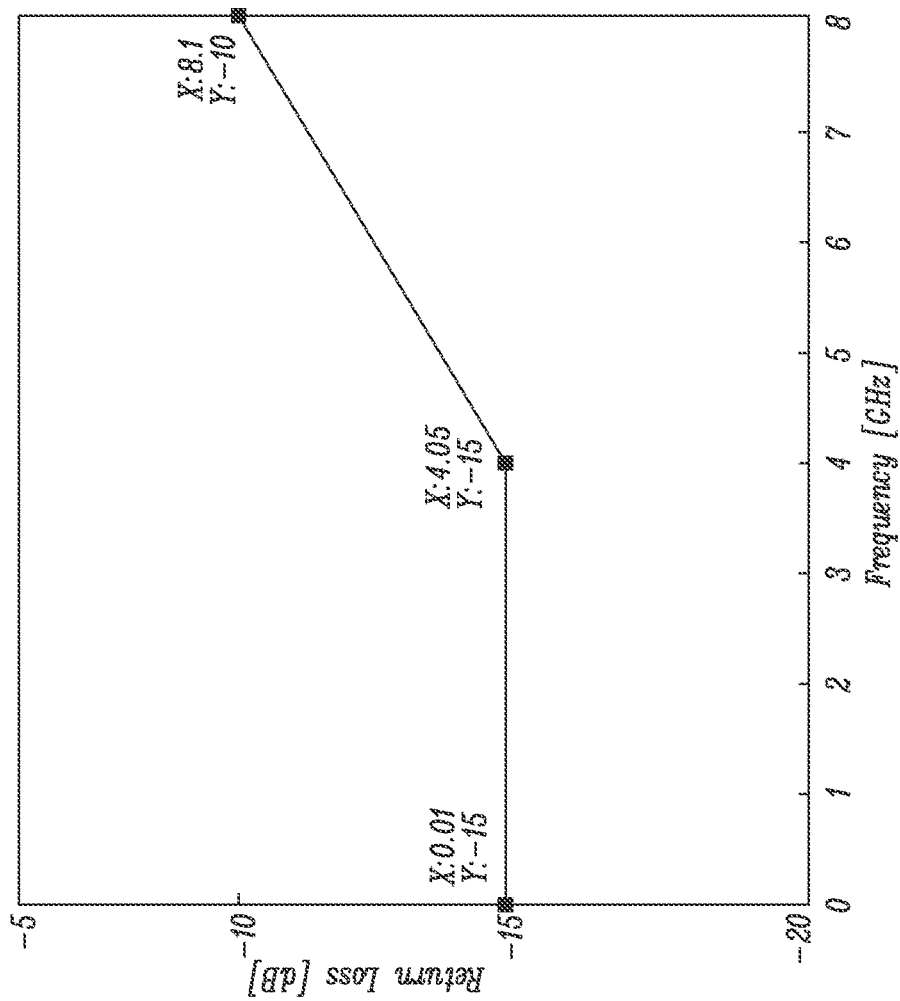
FIG. 9 is a plot of the maximum return loss experienced by the high-speed wire pairs with reference normalized to 90-Ohm, differential, according to certain embodiments of the current invention.

In certain embodiments, as shown in FIG. 9, all high-speed pairs shall meet the following return loss requirements with reference normalized to 90-Ohm, differential. As shown in the FIG. 9, the return loss is −15 dB or better for frequency up to 4.05 GHz.

Figure 10:
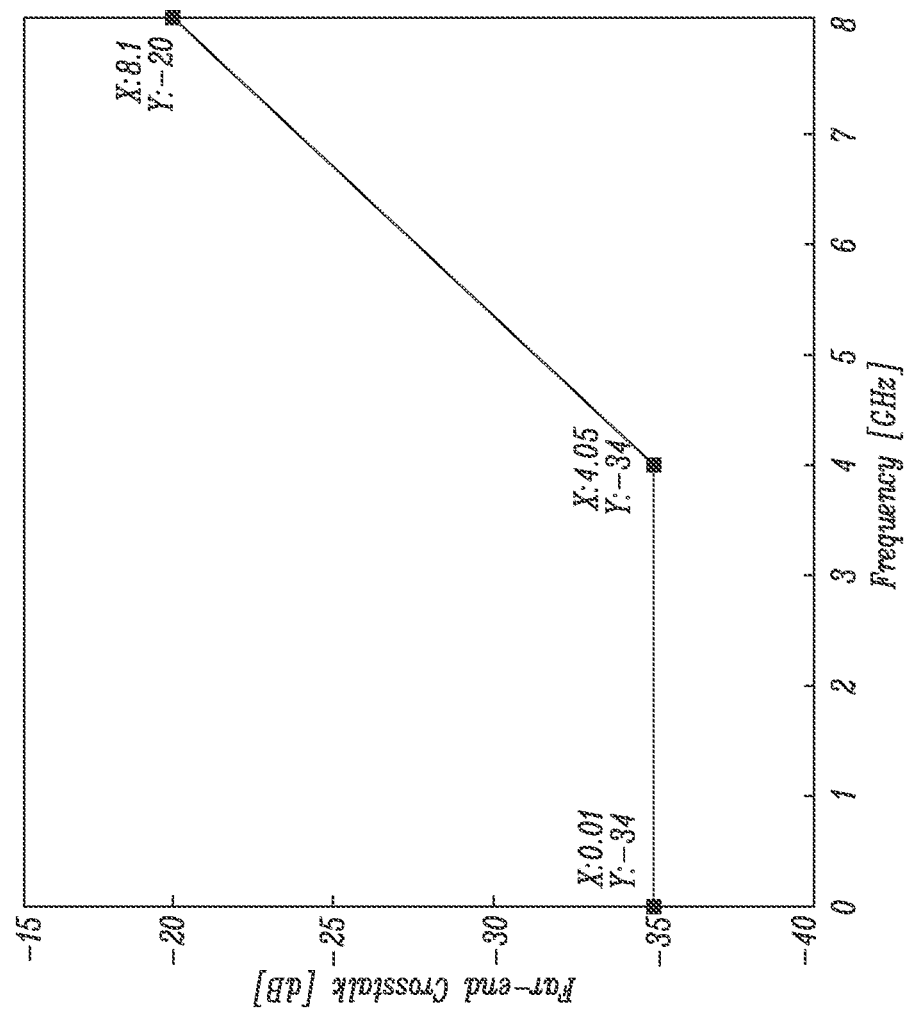
FIG. 10 is a plot of the maximum crosstalk experienced by the high-speed pairs with reference normalized to 90-Ohm, differential, according to certain embodiments of the current invention.

In certain embodiments, as shown in FIG. 10, each of the high-speed pairs shall meet the following crosstalk requirements with the rest of high-speed pairs with reference normalized to 90-Ohm, differential. For frequency up to 4.05 GHz, the far-end crosstalk between two of high-speed pairs shall be −34 dB or less.

Figure 11:
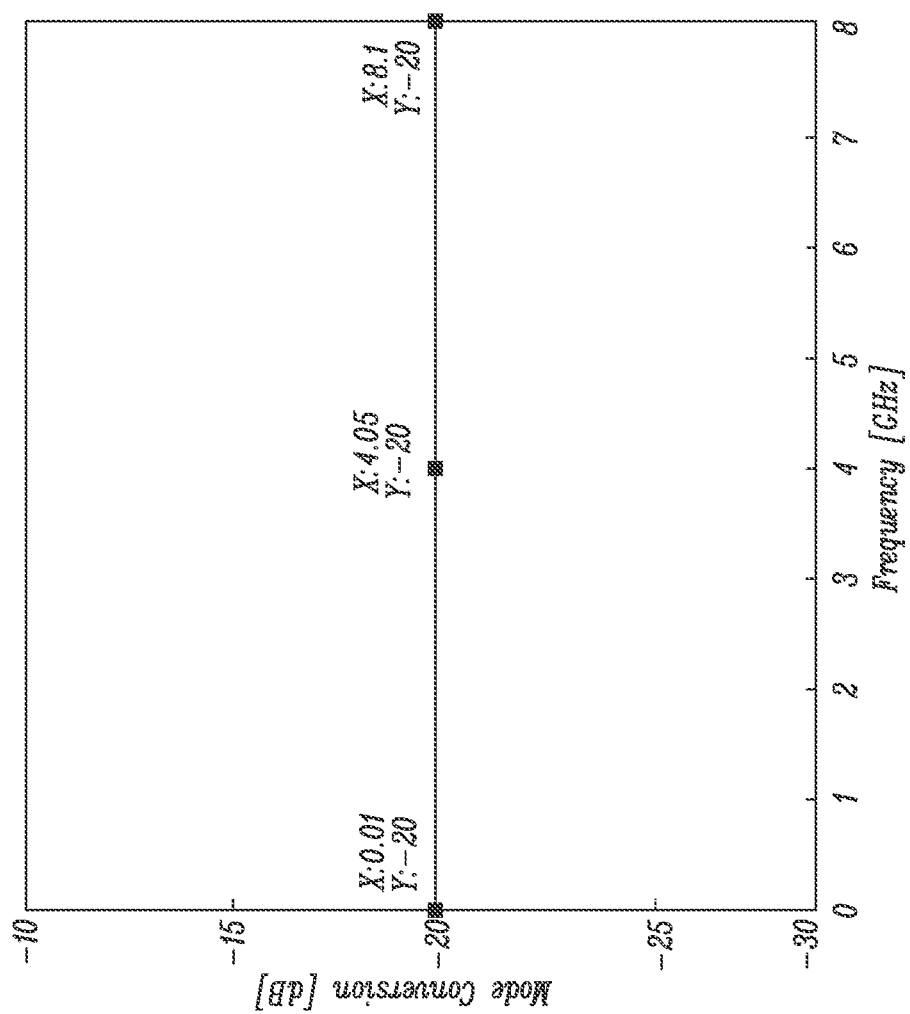
FIG. 11 is a plot illustrating mode conversion according to certain embodiments of the current invention.

In certain embodiments, as shown in FIG. 11, for frequencies up to 8.1 GHz, mode conversion is bounded to −20 dB. For micro-coaxial wire constructions, mode conversion is linearly proportional to intra-pair skews (i.e. length difference between P leg and N leg of a differential pair). Preferentially, unit length skew of 15 ps (i.e. 15 ps/meter) is aligned to −20 dB mode conversion.

Figure 12:
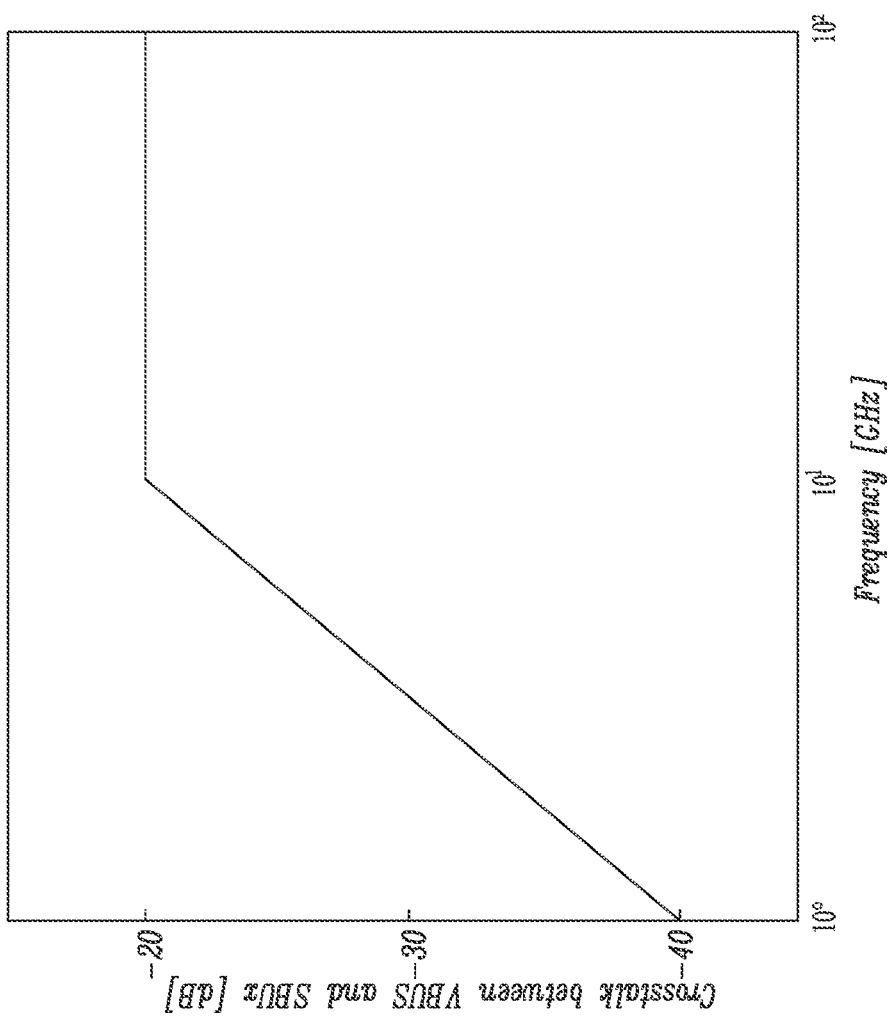
FIG. 12 is a plot of the maximum single-ended crosstalk between VBUS and SBUx (x=1, and 2), according to certain embodiments of the current invention.

In certain embodiments, single-ended crosstalk between VBUS and SBUx (x=1, and 2) meets the requirements shown in FIG. 12 to suppress power transient noise ingression to SBU signals in in-rush or load-release events.

Figure 7:
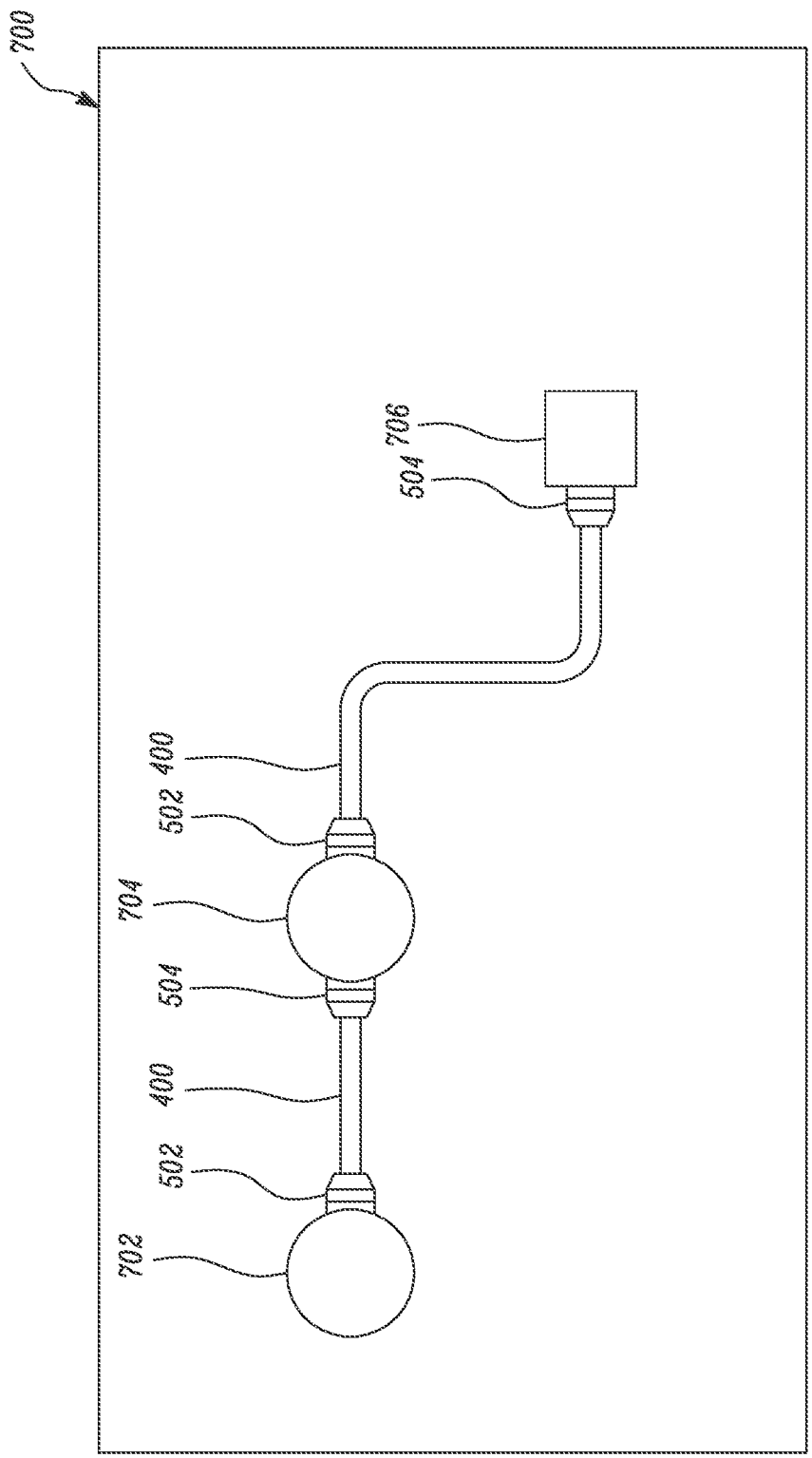
FIG. 7 illustrates an exemplary use of the structural cable to connect sensor components in an automobile and maintaining form according to certain embodiments of the current invention.

FIG. 7 illustrates an exemplary use of the structured cables to connect sensors within an automobile according to certain embodiments of the current invention. Structured cables 400 with connectors 502 and 504 connect sensors 702 and 704 to GPU/CPU 706 within automobile 700. The sensors may be connected to a GPU and/or CPU using structured cables with connectors by daisy chaining the sensors to one another and then to the GPU/CPU. Alternatively, the sensors may be directly connected to a GPU and/or CPU without being daisy chained to other sensors. As can be seen in FIG. 7, the structural cable may be bent to achieve the desired geometry to route the structural cables where desired, and sustain the bent geometry through the duration of operation. The sensors may be optical or infrared cameras. Alternatively, they may be radar, LIDAR, ultrasonic sensors, another sensor, or another device. Because of a more precise routing of the structural cable with end connectors (compared to traditional, flexible cables in which large amount of slack is necessary to make the connections), it is possible to increase signal-to-noise ratios by using shorter cables between pre-determined locations. Further, the structural rigidity can significantly reduce installation times and increase automation as described above.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. For example, reference is made to "wire" or "wires," but a person of ordinary skill in the art will understand that in certain embodiments, one or more conductors (for example, metal without any insulation or outer sheathing) may be substituted. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed structural cable assembly. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/ or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A structural cable comprising:
    a first conductor;
    a second conductor;
    a third conductor, wherein the first conductor, the second conductor and the third conductor are collinear to one another;
    a structural element;
    a body formed around the first conductor, the second conductor, the third conductor and the structural element, wherein the body is made of a non-conducting material and includes a first end and a second end;
    a first connector having a plurality pins arranged linearly on a side of the structural element, the first connector disposed on the first end of the body and coupled to the first conductor, the second conductor and the third conductor; and
    a second connector having a plurality of pins arranged linearly on the side of the structural element, the second connector disposed on the second end of the body and coupled to the first conductor, the second conductor and the third conductor.

2. The structural cable of claim 1, wherein the body is molded from an extrudate drawn in an extrusion process to flow around an outer surface of the first, second and third conductors and an outer surface of the structural element, and plastically solidifying the extrudate on the outer surface of the first, second and third conductors and the outer surface of the structural element respectively.

3. The structural cable of claim 1, wherein the structural element comprises a non-conducting material.

4. The structural cable of claim 1, wherein the body is formed through a lamination process.

5. The structural cable of claim 1, wherein a distance between the first conductor and the second conductor is a repeatable pitch.

6. The structural cable of claim 1, wherein a distance between each pair of adjacently located conductors of the first conductor, the second conductor and the third conductor is equal.

7. The structural cable of claim 1, where in the plurality of pins of the first connector have a V shape or open-triangle shape.

8. The structural cable of claim 1, wherein the plurality of pins of the first connector include a first set of pins and a second set of pins, the first and second sets of pins being disposed on opposite sides of the structural element.

9. The structural cable of claim 1, wherein one or more pins of the plurality of pins of the first connector is connected to a ground conductor and one or more pins of the plurality of pins of the first connector is connected to a conductor capable of carrying high-speed data communications.

10. The structural cable of claim 1, wherein the plurality of pins of the first connector include pins connected to conductors for data transmission, pins connected to conductors for power transmission, and pins connected to conductors for use as a secondary bus.

11. The structural cable of claim 1, wherein the first conductor and the second conductor have an impedance of between 40 and 50 Ohms.

12. A structural cable comprising:
    a first conductor;
    a second conductor, the first and second conductors capable of carrying high-speed data communications;
    a third conductor capable of carrying power;
    a structural element;
    a body formed around the first conductor, the second conductor, the third conductor and the structural element, wherein the body is made of a non-conducting material and includes a first end and a second end;
    a first connector having a first set of pins and a second set of pins disposed on opposite sides of the structural element, the first connector disposed on the first end of the body and coupled to the first conductor, the second conductor and the third conductor; and
    a second connector disposed on the second end of the body and coupled to the first conductor, the second conductor and the third conductor.

* * * * *